United States Patent
Yang et al.

(10) Patent No.: US 10,701,480 B1
(45) Date of Patent: Jun. 30, 2020

(54) MICROPHONE SYSTEM FOR HEAD-MOUNTED WEARABLE DEVICE

(71) Applicant: AMAZON TECHNOLOGIES, INC., Seattle, WA (US)

(72) Inventors: Jung Sik Yang, Cupertino, CA (US); Xuan Zhong, Mountain View, CA (US); Jianchun Dong, Palo Alto, CA (US); Zhen Xu, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/386,164

(22) Filed: Dec. 21, 2016

(51) Int. Cl.
*H04R 9/06* (2006.01)
*H04R 1/46* (2006.01)
(Continued)

(52) U.S. Cl.
CPC ........... *H04R 1/46* (2013.01); *G02B 27/0176* (2013.01); *G02C 5/143* (2013.01); *G02C 5/18* (2013.01);
(Continued)

(58) Field of Classification Search
CPC ........ G02C 11/06; G02C 5/143; H04R 1/105; H04R 1/2876; H04R 1/028; H04R 1/46; H04R 2420/07; H04R 2460/13; H04R 25/405; H04R 25/407; H04R 25/604; H04R 2225/43; H04R 2225/41; H04R 2460/01; H04R 2430/21; H04R 1/02; H04R 1/08; H04R 1/083; H04R 19/04; H04R 2201/023; H04R 11/04; H04R 21/021; G02B 27/0176; G02B 2027/0163; G10L 13/043; G10L 21/0208
(Continued)

(56) References Cited

U.S. PATENT DOCUMENTS 2,962,562 A * 11/1960 McCarrell .............. G02C 11/06
 381/161
4,520,238 A 5/1985 Ikeda
(Continued)

FOREIGN PATENT DOCUMENTS

EP 0109646 5/1984
WO WO2015109810 7/2015

OTHER PUBLICATIONS

Dang, Hung Xuan, "Non-Final Office Action dated Oct. 19, 2017", U.S. Appl. No. 15/084,422, The United States Patent and Trademark Office, dated Oct. 19, 2017.
(Continued)

*Primary Examiner* — Leshui Zhang
(74) *Attorney, Agent, or Firm* — Lindauer Law, PLLC

(57) ABSTRACT

A head-mounted wearable device (HMWD) includes a plurality of microphones. These microphones may be used to acquire audio data produced by the user, such as speech, or sound from the ambient environment. In one implementation, a first air conduction (AC) microphone is emplaced at a bridge of the nose of the HMWD, a second AC microphone at a hinge, and a bone conduction (BC) microphone is positioned at a distal end of one of the temples of the HMWD. For example, the BC microphone may be located in the left temple proximate to the apex of the user's ear. A semi-rigid structure may provide mechanical coupling between the user's head and the BC microphone.

20 Claims, 10 Drawing Sheets

(51) Int. Cl.
*H04R 1/28* (2006.01)
*H04R 1/02* (2006.01)
*G02B 27/01* (2006.01)
*G02C 11/00* (2006.01)
*G02C 5/18* (2006.01)
*G02C 5/14* (2006.01)

(52) U.S. Cl.
CPC .............. *G02C 11/10* (2013.01); *H04R 1/028* (2013.01); *H04R 1/2876* (2013.01); *G02B 2027/0178* (2013.01); *H04R 2460/13* (2013.01)

(58) Field of Classification Search
USPC ........ 381/312–330, 74, 23.1, 309, 150, 151, 381/337, 339, 345, 253, 354, 162, 364, 381/365, 366, 367, 368, 178, 179, 370, 381/372, 374, 376, 382, 383, 385, 386, 381/395, 190, 191, 410, 411, 38, 5, 361, 381/3, 64, 83; 455/569.1, 575.2; 700/94
See application file for complete search history.

(56) References Cited

U.S. PATENT DOCUMENTS

| | | | | |
|---|---|---|---|---|
| 4,654,883 A * | 3/1987 | Iwata | ............... | H04B 1/385 379/430 |
| 5,151,944 A * | 9/1992 | Yamamura | ............. | B60K 28/06 381/114 |
| 9,482,882 B1 | 11/2016 | Hanover et al. | | |
| 2004/0157649 A1* | 8/2004 | Jannard | ............... | G02C 11/06 455/569.1 |
| 2006/0132382 A1* | 6/2006 | Jannard | ............... | G02C 11/06 345/8 |
| 2010/0110368 A1* | 5/2010 | Chaum | ............... | G02B 27/017 351/158 |
| 2011/0139163 A1 | 6/2011 | Hillila | | |
| 2011/0224481 A1* | 9/2011 | Lee | ............... | G02C 11/06 600/25 |
| 2012/0194419 A1 | 8/2012 | Osterhout et al. | | |
| 2012/0289162 A1* | 11/2012 | Hosoi | ............... | H04R 25/606 455/41.3 |
| 2013/0329918 A1* | 12/2013 | Kubba | ............... | G02B 27/017 381/151 |
| 2015/0230033 A1* | 8/2015 | Sprague | ............... | H04R 25/604 381/313 |
| 2015/0341717 A1* | 11/2015 | Song | ............... | H04R 1/08 381/110 |
| 2015/0365754 A1* | 12/2015 | Perl | ............... | H04R 3/00 381/86 |
| 2016/0246059 A1* | 8/2016 | Halpin | ............... | G02B 27/0176 |
| 2018/0035219 A1* | 2/2018 | Gustafsson | ............ | H04R 25/65 |

OTHER PUBLICATIONS

Hakansson, BO E., "The balanced electromagnetic separation transducer: A new bone conduction transducer", Department of Signals and Systems, Chalmers University of Technology, S-412 96 Goteborg, Sweden. J. Acoust. Soc. Am. 113 (2), Feb. 2003. Retrieved from the Internet: <URL:http://www.knowles.com/eng/content/download/3060/35850/version/3/file/BU-23842-000.pdf>.

Knowles Electronics, "Vibration Transducer, Outline Drawing", Retrieved from the Internet: <URL: http://www.knowles.com/eng/content/download/3060/35850/version/3/file/BU-23842-000.pdf>.

Dang, Hung Xuan, "Non-final Office Action dated Mar. 11, 2019", U.S. Appl. No. 15/084,422, The United States Patent and Trademark Office, dated Mar. 11, 2019.

Dang, Hung Xuan, "Notice of Allowance dated Jun. 25, 2019", U.S. Appl. No. 15/084,422, The United States Patent and Trademark Office, dated Jun. 25, 2019.

\* cited by examiner

MICROPHONE SYSTEM FOR HEAD-MOUNTED WEARABLE DEVICE

BACKGROUND

Wearable devices provide many benefits to users, allowing easier and more convenient access to information and services. Wearable devices may utilize a microphone to acquire audio input.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
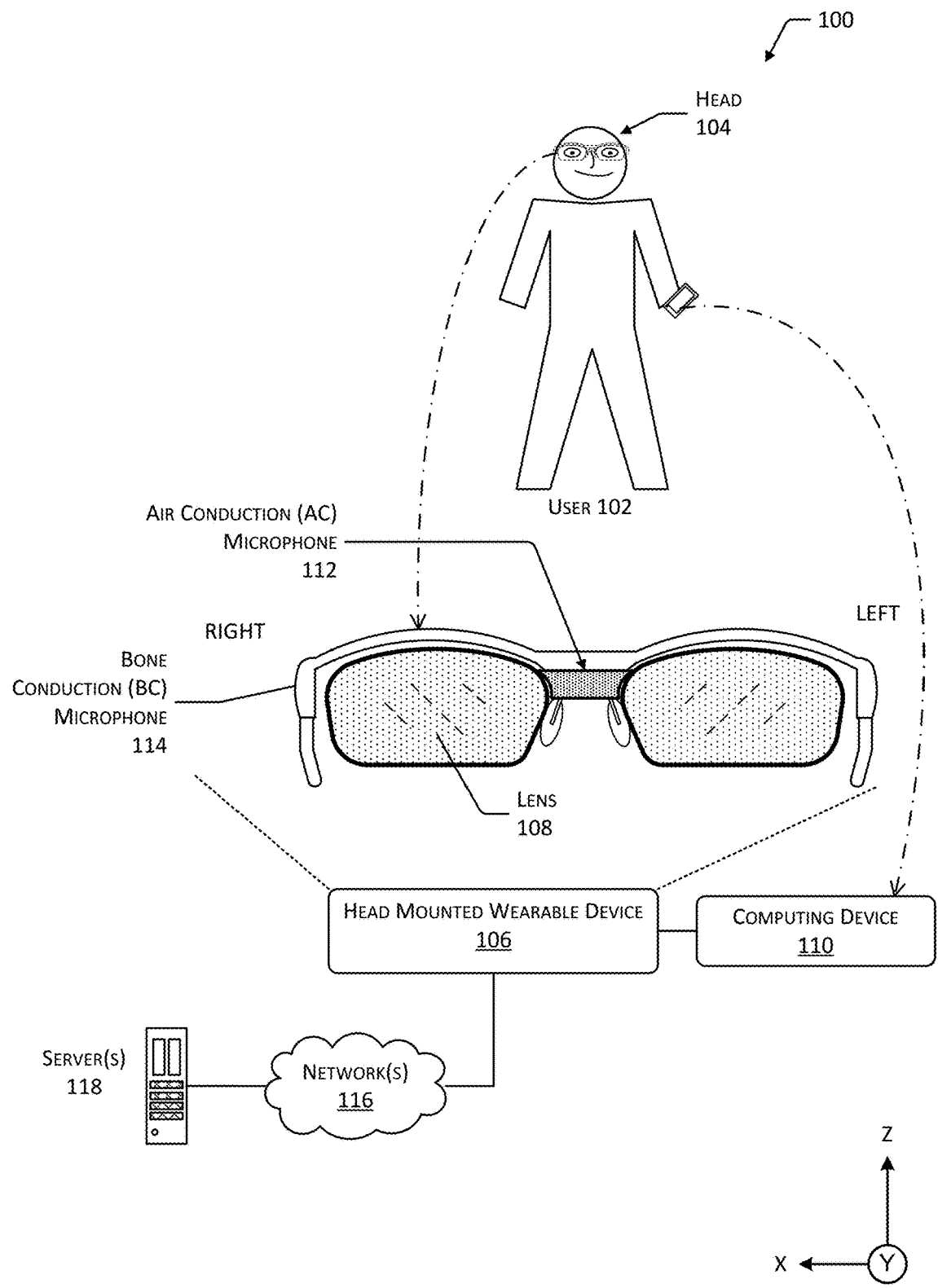
FIG. 1 depicts a system including a head-mounted wearable device equipped with air conduction (AC) and bone conduction (BC) microphones, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyewear or eyeglasses, may facilitate access to information.

The HMWD may utilize one or more different types of microphones. An air conduction (AC) microphone is responsive to vibrations in the air while a bone conduction (BC) microphone is responsive to vibrations in another medium such as a head of a user. These different types of microphones may be used separately from one another, or in conjunction with one another. For example, the AC mic may be used to acquire speech that may be used for a real time call with another person, while the BC microphone may be used acquire speech that is processed by automated speech recognition. In another example, the output from both the AC microphone and the BC microphone may be used for automated speech recognition.

Described in this disclosure are various configurations of microphones for the HMWD. The HMWD may include a plurality of AC microphones. In one implementation, a first AC microphone may be located within the bridge of the HMWD, approximately above the user's nose during typical wear of the HMWD. A second AC microphone may be located within one of the hinges. Sound may be provided to the AC microphones by way of AC microphone ports. For example, the first AC microphone may have an AC microphone port that opens towards the user's head, while the second AC microphone may have an AC port that opens downwards towards the user's feet. A BC microphone may be located within the temple, such as proximate to the user's left ear during typical wear of the HMWD. In another implementation, a BC microphone may be located within the bridge of the HMWD, while one or more AC microphones may be located within the hinges or temples of the HMWD.

The BC microphone within the temple may include several features to improve the overall performance. The BC microphone may be in contact with the pillar that in turn is in contact with or part of a head contact piece. During typical wear, the head contact piece is in contact with the least a portion of the user's head. The head contact piece may be contoured to increase the amount of surface area in contact with the user's head. Vibrations from the user's head, such as those resulting from vocalization by the user, may be transferred to the head contact piece. Those vibrations are in turn conveyed via the pillar to the BC microphone. The BC microphone then generates audio output data based on the vibrations. The BC microphone may be secured to the HMWD by way of a vibration damper. For example, the vibration damper may comprise an elastomeric material or other structure. The vibration damper attenuates the transfer of vibration from the structure of the HMWD to the BC microphone.

By utilizing the structures described herein, the HMWD that incorporates one or more different types of microphones may be constructed. Additionally, the mounting of the BC microphone may improve the quality of the audio output. For example, the vibration damper may reduce the amplitude of noises such as when the user touches a finger or hand of the HMWD.

Illustrative System

FIG. 1 depicts a system 100 in which a user 102 is wearing on their head 104 a head-mounted wearable device (HMWD) 106 in a general form factor of eyeglasses. The HMWD 106 may include one or more lenses 108. The lenses 108 may be shaped to provide a particular refractive effect on light rays. For example, the lenses 108 may be shaped pursuant to a prescription for refractive correction produced by an optometrist. The lenses 108 may provide no refractive correction, such as "plano" lenses. The lenses 108 may include a tint, coloring, photochromic material, coating, and so forth. For example, the lenses 108 may be tinted to protect the eyes of the user 102 from ultraviolet light. The lenses 108 may provide other functionality as well. For example, the lenses 108 may act as a surface onto which an image may be presented from an electronic display.

The HMWD 106 may be in communication with one or more affiliated computing devices 110. For example, the HMWD 106 may communicate with the computing device 110 using a personal area network (PAN) such as Bluetooth®. The computing device 110 may be used at least in part to provide additional resources, such as access to a network, compute resources, storage, display output, and so forth. The computing devices 110 may comprise a smart phone, tablet, local server, in vehicle computer system, and so forth. For example, the computing device 110 may comprise a smart phone that includes a display. The display of the smart phone may be used to present a graphical user interface.

The AC microphone 112 may comprise a diaphragm, micro-electromechanical system (MEMS) element, or other elements that generate data in response to the displacement of air by sound waves. AC microphone data may be generated that is indicative of the sound detected by the AC microphone 112. In some implementations, the HMWD 106 may include a plurality of AC microphones 112. For example, a pair of AC microphones 112 to be operated in conjunction. Continuing the example, beamforming techniques may be used to provide some degree of gain or directionality, such that audio uttered by the user 102 may be acquired while reducing the effect of noise in the ambient environment. In another example, the first AC microphone 112 may exhibit a particular frequency response while the second AC microphone 112 exhibits a different frequency response.

The AC microphone 112 may utilize one or more AC microphone ports as described next. The AC microphone ports provide an entry for vibrations from the medium that is carrying the sound, such as the air in the ambient environment, that is to be detected by the AC microphone 112. These microphone ports may comprise apertures in a housing or cover, one or more channels or choose the direct the vibrations to the AC microphone 112, and so forth.

The BC microphone 114 is responsive to the vibrations produced by the user 102, such as while vocalizing. For example, the BC microphone 114 may comprise a piezoceramic accelerometer in the BU product family as produced by Knowles Corporation of Itasca, Ill. Continuing the example, the Knowles BU-23842 vibration transducer provides an analog output signal that may processed as would the analog output from a conventional AC microphone. The BC microphone 114 may utilize piezoelectric elements, microelectromechanical (MEMs) elements, optical elements, capacitive elements, a voice coil, and so forth.

The BC microphone 114 may be arranged to be in contact with the skin above a bony or cartilaginous structure. For example, a head contact piece in the temple of the HMWD 106 may be mechanically coupled to the BC microphone 114 such that vibrations of the temporal bone or other structures upon which the head to contact piece rests are transmitted to the BC microphone 114. In another example, where the HMWD 106 is in the form of eyeglasses, nose pads of a nosepiece may be mechanically coupled to the BC microphone 114. In other implementations, the BC microphone 114 may be located elsewhere with respect to the HMWD 106, or worn elsewhere by the user 102.

The HMWD 106 may be in communication with the other devices via one or more networks 116. For example, the network 116 may comprise a personal area network, local area network, metropolitan area network, wide area network, and so forth. The HMWD 106 may use the networks 116 to access one or more services that are provided by the other devices. For example, the HMWD 106 may establish communication with one or more servers 118. These one or more servers 118 may provide one or more services, such as automated speech recognition, information retrieval, messaging, and so forth.

The structures depicted in this and the following figures are not necessarily according to scale. Furthermore, the proportionality of one component to another may change with different implementations. In some illustrations, the size of one structure may be exaggerated with respect to another to facilitate illustration, and not necessarily as a limitation.

The objects described herein may be affixed to one another using one or more of mechanical interference fits, fasteners, adhesives, welding, and so forth. The affixation of one object to another, or one portion of an object to another, may be reversible or not. For example, a screw may be designed to allow for the insertion or removal of the screw, while a mechanical interference fit may include a tab that cannot be released once it is been engaged. It is understood, but these various techniques to fix one object to another may be used in various combinations with one another.

Figure 2:
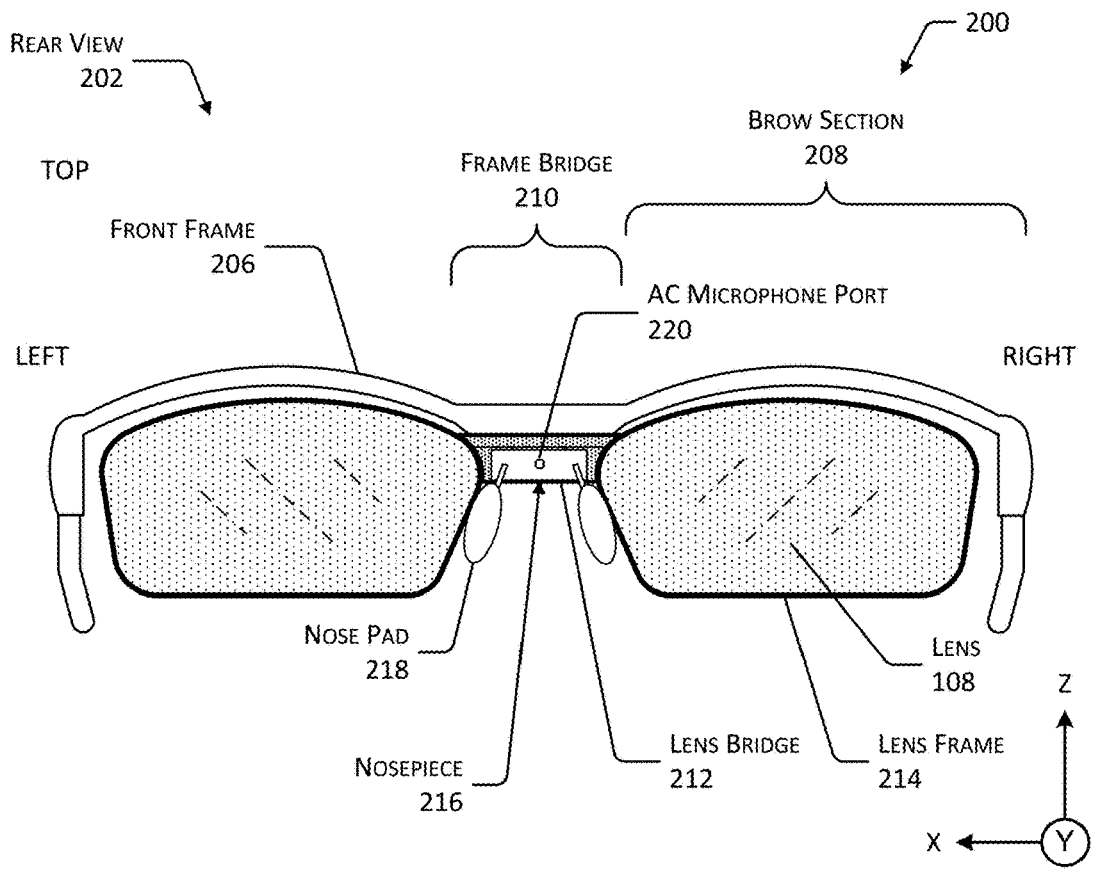
FIG. 2 depicts exterior views of a head-mounted wearable device showing an AC microphone port, according to some implementations.
Figure 2:
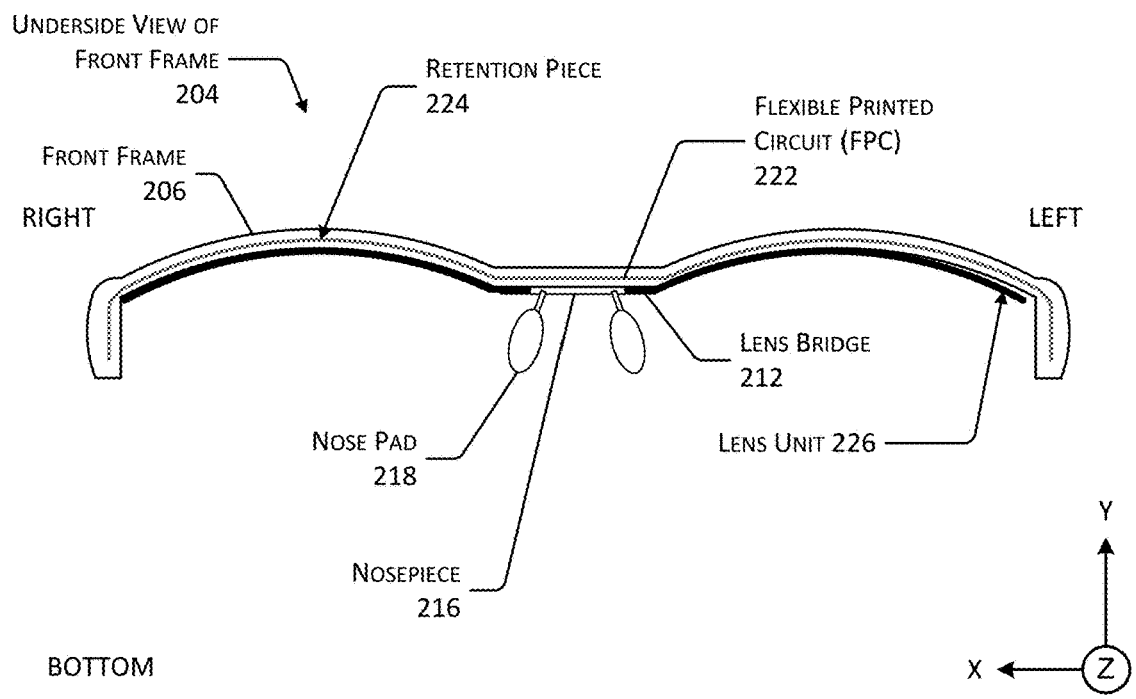

FIG. 2 depicts views 200 of the HMWD 106, according one implementation. A rear view 202 shows the exterior appearance of the HMWD 106 while an underside view 204 shows selected components of the HMWD 106.

In the rear view 202, a front frame 206 is depicted. The front frame 206 may include a left brow section 208(L) and a right brow section 208(R) that are joined by a frame bridge 210. In some implementations, the front frame 206 may comprise a single piece of material, such as a metal, plastic, ceramic, composite material, and so forth. For example, the front frame 206 may comprise 6061 aluminum alloy that has been milled to the desired shape. In another example, the front frame 206 may comprise injection molded plastic. In other implementations, the front frame 206 may comprise several discrete pieces that are joined together by way of mechanical engagement features, welding, adhesive, and so forth.

A lens bridge 212 may be located between the left lens 108(L) and the right lens 108(R). The lens bridge 212 is depicted here as joining a left lens frame 214 and a right lens frame 214.

The lens bridge 212 may be mounted to the frame bridge 210. A nosepiece 216 may be affixed to the lens bridge 212. One or more nose pads 218 may be affixed to, or integral with, the nosepiece 216. The nose pads 218 aid in the support of the front frame 206 and may improve comfort of the user 102.

The nosepiece 216 may include an air conduction (AC) microphone port 220. The AC microphone port 220 may comprise a passageway or hole through the nosepiece 216 that allows sound vibrations to be conveyed to an AC microphone 112 located within the frame bridge 210.

As described above, the lens frames 214 may be used to retain lenses 108. The lenses 108 may have specific refractive characteristics, such as in the case of prescription lenses. The lenses 108 may be clear, tinted, photochromic, electrochromic, and so forth. For example, the lenses 108 may comprise plano (non-prescription) tinted lenses to provide protection from the sun. In some implementations, only a single lens 108 may be installed.

The underside view 204 depicts the front frame 206. One or more electrical conductors, optical fibers, transmission lines, and so forth, may be used to connect various components of the HMWD 106. In this illustration, arranged within a channel is a flexible printed circuit (FPC) 222. The FPC 222 allows for an exchange of electrical signals, optical signals, radio signals, power, and so forth, between devices in the HMWD 106. For example, the FPC 222 may be used to provide connections for electrical power and data communications between electronics in one or both of the temples of the HMWD 106.

A retention piece 224 may be placed between the FPC 222 within the channel and the exterior environment. The retention piece 224 may comprise a single piece or several pieces. The retention piece 224 may comprise an overmolded component, a channel seal, a channel cover, and so forth. For example, the material comprising the retention piece 224 may be formed into the channel while in one or more of a powder, liquid or semi-liquid state. The material may subsequently harden into a solid or semi-solid shape. Hardening may occur as a result of time, application of heat, light, electric current, and so forth. In another example, the retention piece 224 may be affixed to the channel or a portion thereof using adhesive, pressure, and so forth. In yet another example, the retention piece 224 may be formed within the channel using an additive technique, such as using an extrusion head to deposit a plastic or resin within the channel, a laser to sinter a powdered material, and so forth. In still another example, the retention piece 224 may comprise a single piece produced using injection molding techniques. In some implementations, the retention piece 224 may comprise an overmolded piece. The FPC 222 may be maintained within the channel by the retention piece 224. The retention piece 224 may also provide devices within the channel with protection from environmental contaminants such as dust, water, and so forth.

The retention piece 224 may be sized to retain the FPC 222 within the channel. The retention piece 224 may include one or more engagement features. The engagement features may be used to facilitate retention of the retention piece 224 within the channel of the front frame 206. For example, the distal ends of the retention piece 224 may include protrusions configured to engage a corresponding groove or receptacle within a portion of the front frame 206. Instead of, or in addition to the engagement features, an adhesive may be used to bond at least a portion of the retention piece 224 to at least a portion of the channel in the front frame 206.

The retention piece 224 may comprise a single material, or a combination of materials. The material may comprise one or more of an elastomer, a polymer, a ceramic, a metal, a composite material, and so forth. The material of the retention piece 224 may be rigid or elastomeric. For example, the retention piece 224 may comprise a metal or a resin. In implementations where the retention piece 224 is rigid, a retention feature such as a tab or slot may be used to maintain the retention piece 224 in place in the channel of the front frame 206. In another example, the retention piece 224 may comprise a silicone plastic, a room temperature vulcanizing rubber, or other elastomer.

A lens unit 226 may comprise one or more of the lens bridge 212, the lens frames 214, the nosepiece 216, the nose pads 218, or the lenses 108. The lens unit 226 may be joined to the front frame 206. For example, screws may secure the lens bridge 212 to the frame bridge 210.

One or more components of the HMWD 106 may comprise single unitary pieces or may comprise several discrete pieces. For example, the front frame 206, the nosepiece 216, the lens unit 226, and so forth, may comprise a single piece, or may be constructed from several pieces joined or otherwise assembled.

Figure 3:
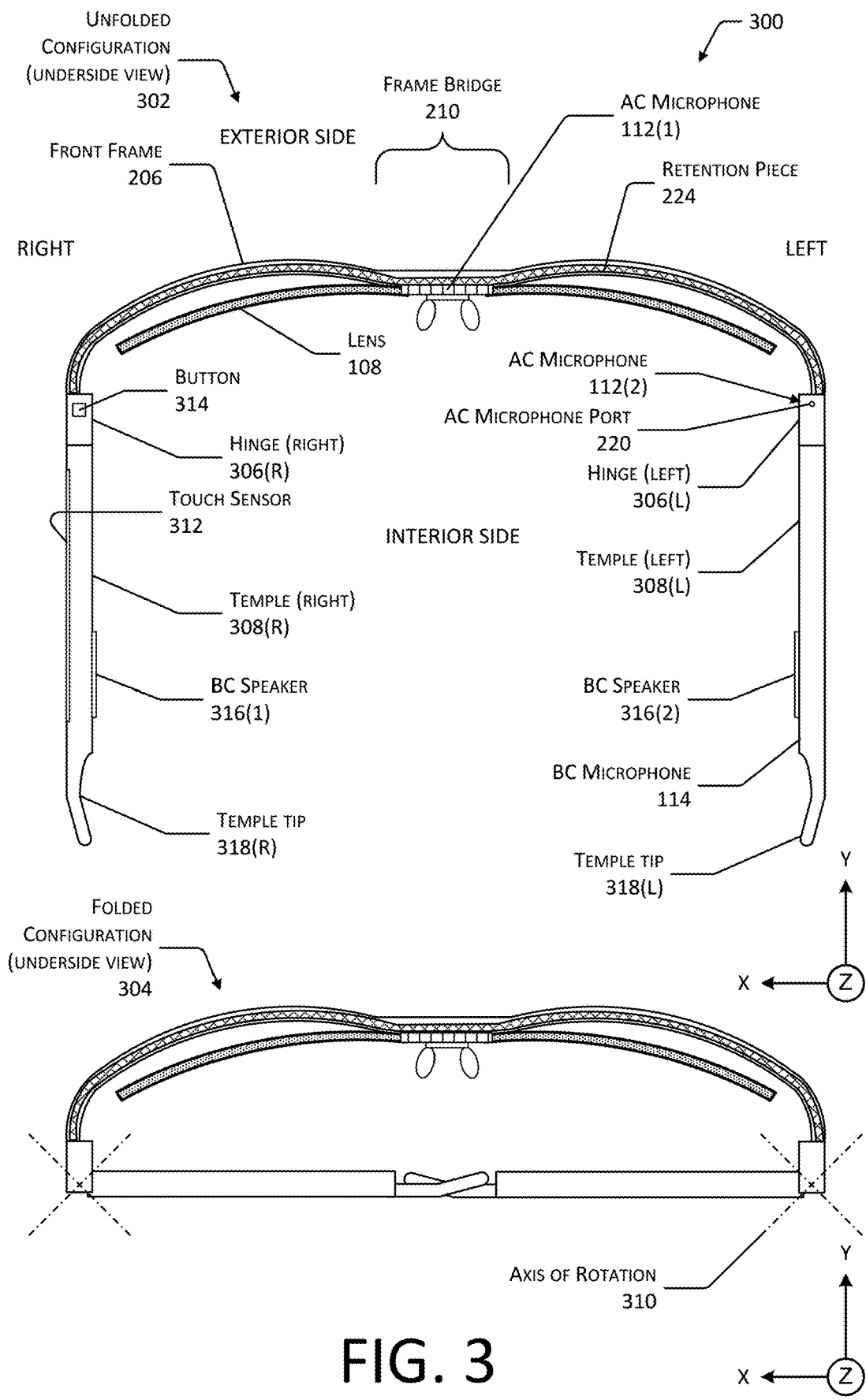
FIG. 3 depicts exterior views, from below, of the head-mounted wearable device in an unfolded and folded configuration, according to some implementations.

FIG. 3 depicts exterior views 300, from below looking up, of the HMWD 106, including a view in an unfolded configuration 302 and a view in a folded configuration 304, according to some implementations. The retention piece 224 that is placed within a channel of the front frame 206 is visible in this view from underneath the HMWD 106.

Also, visible in this view are the lenses 108 of the lens unit 226. Because the lens unit 226 is affixed to the front frame 206 at the frame bridge 210, the front frame 206 may flex without affecting the positioning of the lenses 108 with respect to the eyes of the user 102. For example, when the head 104 of the user 102 is relatively large, the front frame 206 may flex away from the user's head 104 to accommodate the increased distance between the temples. Similarly, when the head 104 of the user 102 is relatively small, the front frame 206 may flex towards the user's head 104 to accommodate the decreased distance between the temples.

One or more hinges 306 may be affixed to, or an integral part of, the front frame 206. For example, the front frame 206 may extend or include a portion of the hinges 306. In another example the hinges 306 may attach to the front frame 306. Depicted are a left hinge 306(L) and a right hinge 306(R) on the left and right sides of the front frame 206, respectively. The left hinge 306(L) is arranged at the left brow section 208(L), distal to the frame bridge 210. The right hinge 306(R) is arranged at the right brow section 208(R) distal to the frame bridge 210.

A temple 308 may couple to a portion of the hinge 306. For example, the temple 308 may comprise one or more components, such as a knuckle, that mechanically engage one or more corresponding structures on the hinge 306.

The left temple 308(L) is attached to the left hinge 306(L) of the front frame 206. The right temple 308(R) is attached to the right hinge 306(R) of the front frame 206.

The hinge 306 permits rotation of the temple 308 with respect to the hinge 306 about an axis of rotation 310. The hinge 306 may be configured to provide a desired angle of rotation. For example, the hinge 306 may allow for a rotation of between 0 and 120 degrees. As a result of this rotation, the HMWD 106 may be placed into a folded configuration, such as shown at 304. For example, each of the hinges 306 may rotate by about 90 degrees, such as depicted in the folded configuration 304.

One or more of the front frame 206, the hinge 306, or the temple 308 may be configured to dampen the transfer of vibrations between the front frame 206 and the temples 308. For example, the hinge 306 may incorporate vibration dampening structures or materials to attenuate the propagation of vibrations between the front frame 206 and the temples 308. These vibration dampening structures may include elastomeric materials, springs, and so forth. In another example, the portion of the temple 308 that connects to the hinge 306 may comprise an elastomeric material.

One or more different sensors may be placed on the HMWD 106. For example, an AC microphone 112 may be located at the frame bridge 210 while a bone conduction (BC) microphone 114 may be emplaced within or proximate to the left hinge 306(L), such as on the underside of the left hinge 306(L). The BC microphone 114 and the AC microphones 112 are maintained at a fixed distance relative to one another during operation. For example, the relatively rigid frame of the HMWD 106 maintains the spacing between the BC microphone 114 and the AC microphone 112. While the AC microphone 112 is depicted proximate to the frame bridge 210, in other implementations, the BC microphone 114 may be positioned at the frame bridge 210.

As described above, the AC microphone 112 may comprise a diaphragm, MEMS element, or other elements that move in response to the displacement of air by sound waves. Air conduction microphone data may be generated that is indicative of the sound detected by the AC microphone 112.

As described above, the BC microphone 114 is responsive to the vibrations produced by the user 102, such as while speaking. The BC microphone 114 may be arranged to be in contact with the skin above a bony or cartilaginous structure. For example, where the HMWD 106 is in the form of eyeglasses, nose pads 218 of a nosepiece 216 may be mechanically coupled to the BC microphone 114 such that vibrations of the nasal bone, glabella, or other structures upon which the nose pads may rest are transmitted to the BC microphone 114. In other implementations, the BC microphone 114 may be located elsewhere with respect to the HMWD 106, or worn elsewhere by the user 102. For example, the BC microphone 114 may be incorporated into the temple 308 of the HMWD 106, a hat or headband.

A touch sensor 312 may be located on one or more of the temples 308. For example, the touch sensor 312 may comprise a capacitive touch sensor, a force sensitive resistor touch sensor, an optical touch sensor, and so forth. Touch sensor data may be generated that is indicative of the location, direction, duration and so forth of the touch.

One or more buttons 314 may be placed in other locations on the HMWD 106. For example, a button 314(1) may be emplaced within, or proximate to, the right hinge 306(R), such as on an underside of the right hinge 306(R).

One or more bone conduction (BC) transducers 316 may be emplaced on the temples 308. For example, as depicted here, a BC speaker 316 may be located on the surface of the temple 308 that is proximate to the head 104 of the user 102 during use. The BC speaker 316 may be configured to generate acoustic output. For example, the BC speaker 316 may comprise a piezoelectric or electromagnetic device that provides audio to the user 102 via bone conduction through the temporal bone of the head 104. In some implementations, the BC speaker 316 may be used to provide the functionality of the BC microphone 114. For example, the BC speaker 316 may be used to detect vibrations of the user's 102 head 104.

A temple tip 318 may extend from a portion of the temple 308 that is distal to the front frame 206. The temple tip 318 may comprise a material that may be reshaped to accommodate the anatomy of the head 104 of the user 102. For example, the temple tip 318 may comprise a thermoplastic that may be warmed to predetermined temperature and reshaped to conform around a dorsal portion of the ear. In another example, the temple tip 318 may comprise a wire that may be bent to fit. The wire may be encased in an elastomeric material.

Figure 4:
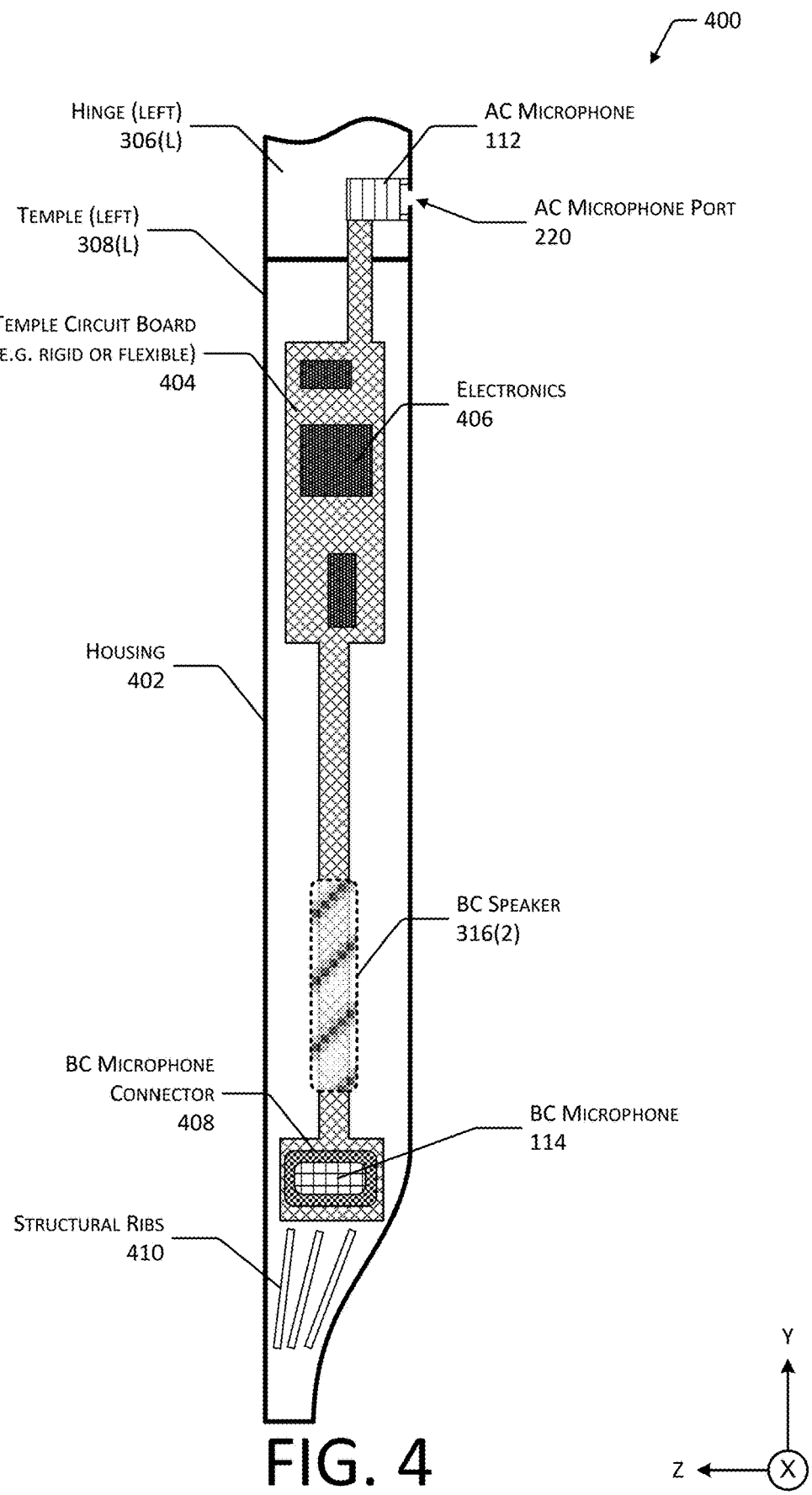
FIG. 4 depicts some of the internal components of a temple of a head-mounted wearable device including a BC microphone, according to some implementations.

FIG. 4 depicts 400 some of the internal components of a left temple 308(L) of a HMWD 106 including a BC microphone 114, according to some implementations. The depiction of the left temple 308(L) is provided by way of example and not necessarily as a limitation. For example, the same or similar structures as described herein may be installed in the right temple 308(R).

A portion of the hinge 306 is depicted. Arranged within the hinge 306 is an AC microphone 112. An AC microphone port 220 for the AC microphone 112 in the hinge 306 is depicted. The AC microphone port 220 may open generally downwards. For example, the aperture of the AC microphone port 220 be on a bottom surface of the hinge 306 and may open towards the feet of the user 102 during normal wear.

As described above, the hinge 306 is coupled to a temple 308. The temple 308 may comprise a housing 402. The housing 402 may comprise one or more elements that serve to enclose at least a portion of the temple 308. The housing 402 may comprise a plastic, metal, ceramic, composite material, and so forth.

A temple circuit board 404 is depicted. The temple circuit board 404 may comprise a rigid or flexible circuit board. For example, the temple circuit board 404 may comprise a flexible printed circuit. In some implementations, the temple circuit board 404 may extend at least partially into the hinge 306. For example, the AC microphone 112 may be connected to the temple circuit board 404.

Electronics 406 may be connected to, affixed to, or otherwise in communication with the temple circuit board 404. For example, integrated circuits may be laminated to the temple circuit board 404.

A BC microphone connector 408 may be affixed to the temple circuit board 404. For example, a pressure sensitive adhesive (PSA) may be used to join the temple circuit board 404 and the BC microphone connector 408. In some implementations, the BC microphone connector 408 may comprise a flexible or elastomeric material into which the BC microphone 114 may be emplaced.

Depicted in this illustration are structural ribs 410. The structural ribs 410 may be used to add rigidity to a distal portion of the temple 308. The structural ribs 410 may also improve structural support for the temple tip 318 (not shown).

Also depicted is a BC speaker 316. The BC speaker 316 may be connected to one or more of the electronics 406. For example, the BC speaker 316 may utilize a flexible printed circuit, wiring harness, and so forth to provide an electrical connection to one or more the electronics 406. In the implementation depicted here, the BC microphone 114 is located proximate to the distal end of the temple 308 and is thus closer to the temple tip 318 than the BC speaker 316. In other implementations, the BC microphone 114, the BC speaker 316, and other elements of the HMWD 106 may be arranged in different locations.

Figure 5:
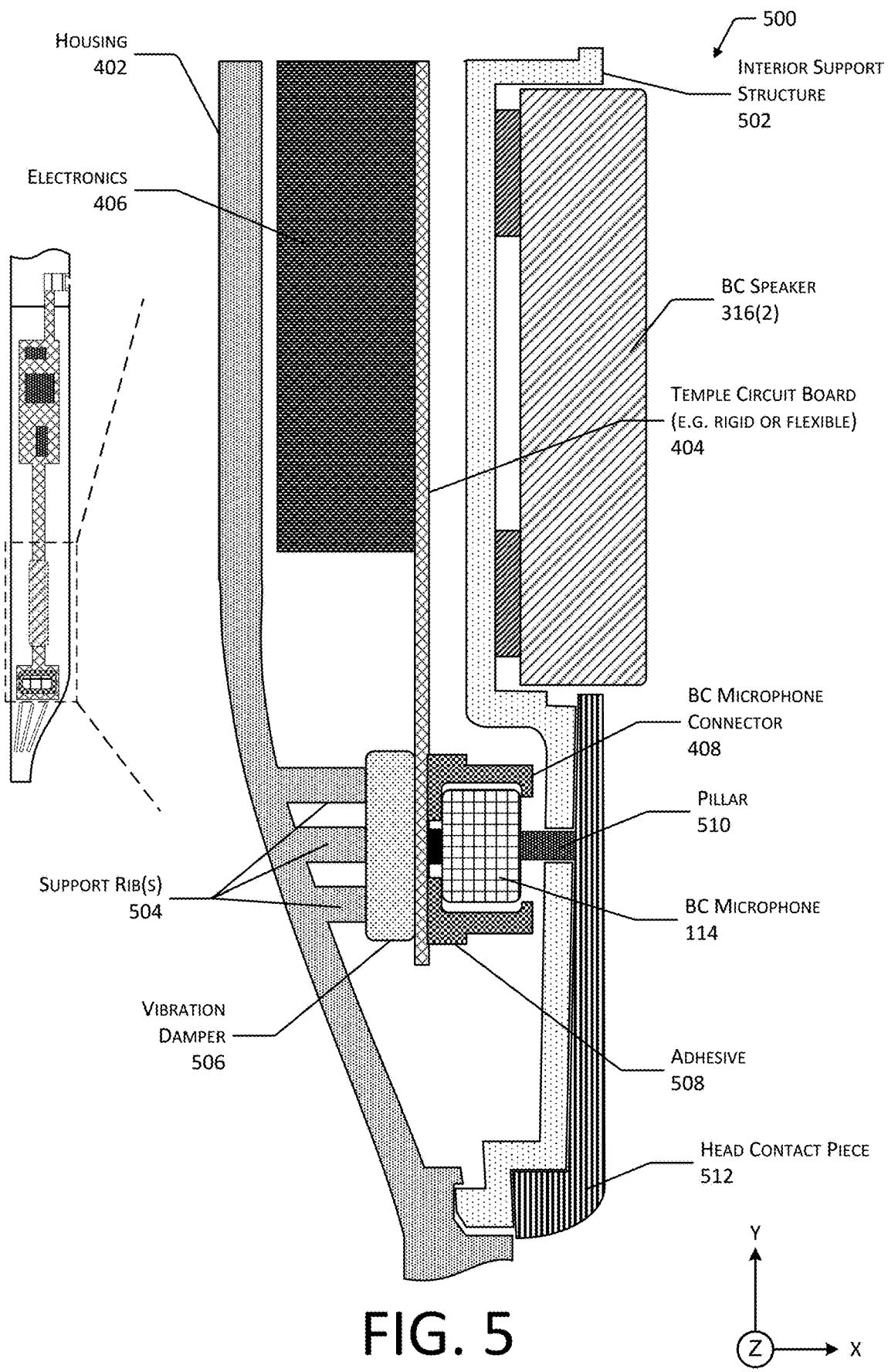
FIG. 5 depicts an enlarged view of a portion of the interior structure of a temple including the mounting of the BC microphone, according to some implementations.

FIG. 5 depicts an enlarged view 500 of a portion of the interior structure of a temple 308 including the mounting of the BC microphone 114, according to some implementations.

In this view, a portion of the housing 402, the temple circuit board 404, and electronics 406 are visible. An interior support structure 502 is also visible. The interior support structure 502 may provide mechanical support for the BC speaker 316, and other structures of the temple 308.

One or more support ribs 504 are depicted that extend from the housing 402. The support ribs 504 provide mechanical support for a vibration damper 506 within the housing 402 of the temple 308. In one implementation, the vibration damper 506 may comprise an elastomeric material. For example, the vibration damper 506 may comprise a piece of Poron® 4701-30 material produced by Rogers Corporation of Rogers, Conn., United States of America. In another example, the vibration damper 506 may comprise a room temperature vulcanizing rubber, silicone rubber, and so forth.

In another implementation, the vibration damper 506 may comprise a mechanically compliant structure. For example, the vibration damper 506 may comprise one or more compression springs or spring elements. The mechanically compliant structure may be separate from the support ribs 504, or may be integrated into at least a portion of the support ribs 504. For example, the support ribs 504 may have a thinning cross section, may be pleated, accordion folded, and so forth, to decouple the BC microphone 114 at least partially from the vibrations of the housing 402.

The vibration damper 506 is arranged between the one or more support ribs 504 and a portion of the temple circuit board 404 to which the BC microphone connector 408 is attached. The BC microphone connector 408 may be attached to the temple circuit board 404 using an adhesive 508. For example, the BC microphone connector 408 may be attached using one or more pieces of a pressure sensitive adhesive (PSA). As described above, in some implementations the BC microphone connector 408 may comprise a compliant material, such as a silicone rubber. During assembly, the BC microphone 114 is inserted into the BC microphone connector 408. One or more retention features, such as a lip or flanged, maintains the BC microphone 114 within the BC microphone connector 408. The BC microphone connector 408 may have one or more holes or apertures at the side in contact with the temple circuit board 404. The temple circuit board 404 may provide a plurality of contacts, such as dot connectors, pads, and so forth. These contacts are configured to establish an electrical connection with the BC microphone 114.

A rigid member such as a pillar 510 provides a mechanical connection between the BC microphone 114 and the head contact piece 512. In some implementations, the head contact piece 512 and a pillar 510 may comprise a single unitary piece. The pillar 510 is configured to transfer vibration of the head contact piece 512 to the bone conduction microphone 114. The head contact piece 512 may be configured to present a surface that is approximately conformal to the head 104 of the user 102 during normal wear. In some implementations, the head contact piece 512 may comprise the relatively rigid structure and a compressible material, such as a foam, on the surface that comes into contact with the head 104.

During operation, at least a portion of the head contact piece 512 is configured to come into contact with at least a portion of the head 104 of the user. Vibrations in the head 104 are conveyed by the head contact piece 512 and along the pillar 510 to the BC microphone 114. In this way, vibrations such as those resulting from the vocalization by the user 102 may be detected by the BC microphone 114. By utilizing the vibration damper 506 and other structures described herein, the performance of the BC microphone 114 is improved.

Figure 6:
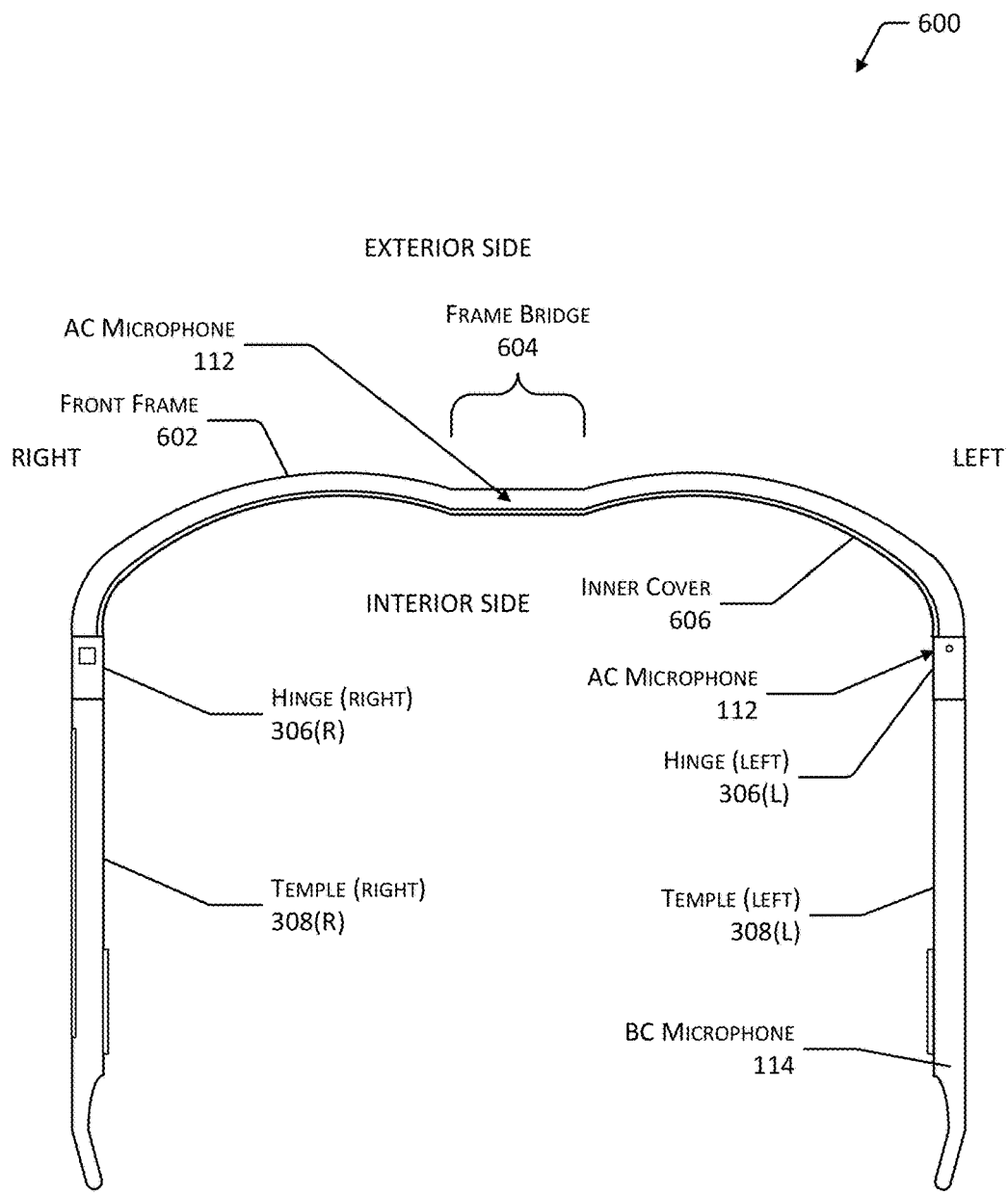
FIG. 6 depicts an exterior view, from below, of the head-mounted wearable device in an unfolded configuration that utilizes an inner cover, according to some implementations.

FIG. 6 depicts an exterior view 600, from below, of the HMWD 106 in an unfolded configuration that utilizes an inner cover, according to another implementation. In this implementation, the HMWD 106 may utilize a front frame 602 that provides integral support for one or more of the lenses 108. Similar to the front frame 206 described above, the front frame 602 may include a frame bridge 604 that joins a left brow section and a right brow section.

The front frame 602 may have an interior side that is proximate to the user 102 during normal wear, and an exterior side that is opposite the interior side. The interior side of the front frame 602 may be open, allowing for the assembly of the HMWD 106 by insertion of the FPC 222, sensors such as the AC microphone 112, and so forth within the front frame 602. Once ready for final assembly, an inner cover 606 may be joined to the interior side of the front frame 602. The inner cover 606 provides concealment and protection for the structures and components within the front frame 602.

Figure 7:
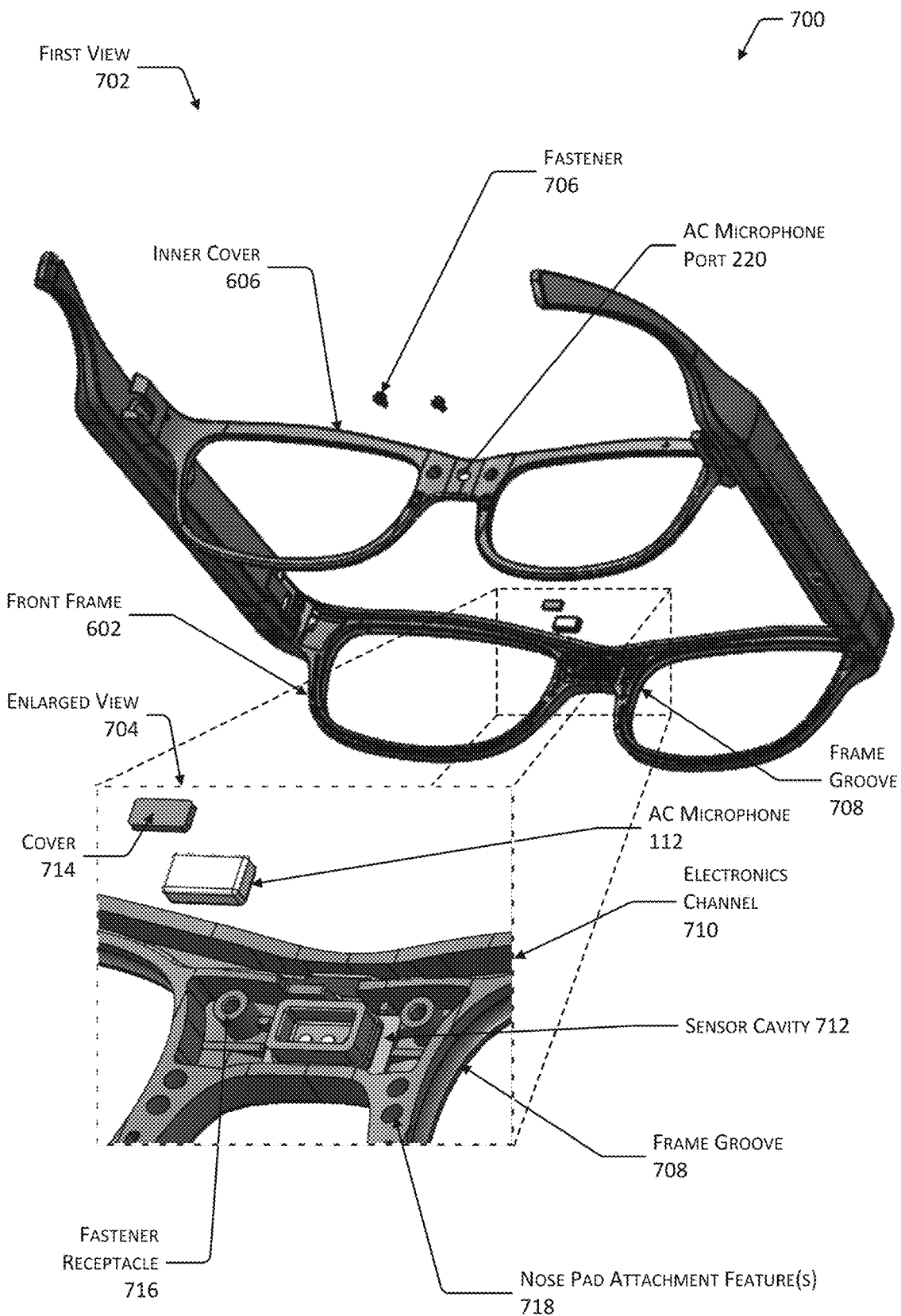
FIG. 7 depicts views of the implementation of FIG. 6, including a front frame with a sensor cavity for placement of the AC microphone and the inner cover with an AC microphone port, according to some implementations.

FIG. 7 depicts views 700 of the implementation of FIG. 6, including a front frame 602 and the inner cover 606. A first view 702 shows a rendering of the front frame 602 prior to the inner cover 606 being joined to the interior side of the front frame 602. An enlarged view 704 provides additional details with regard to the frame bridge 604.

In the first view 702, we see a pair of fastener 706, such as screws that may be used to join the inner cover 606 to the front frame 602. In addition to, or instead of, the screws other techniques may be used to join the inner cover 606 to the front frame 602. For example, mechanical features such as an engagement slot on the front frame 602 and a corresponding engagement ridge along the inner cover 606, or vice versa, may provide for alignment. An adhesive may be placed in the engagement slot to affix the inner cover 606 to the front frame 602.

Depicted on the front frame 602 are frame grooves 708 for each of the respective lenses 108. In the enlarged view 704, the frame groove 708 for the right lens 108 is visible. The walls of the frame groove 708 provide mechanical interference features that maintain engagement of the lens 108 within the front frame 602. During assembly of the HMWD 106, the lenses 108 may be inserted into the front frame 602 before the inner cover 606 is affixed.

Fabrication of the front frame 602 may utilize injection molding techniques. In one implementation, the front frame 602 may comprise a unitary piece of plastic that is formed using injection molding. To form the edges of the frame groove 708, a collapsible insert may be utilized. During the injection molding process, the collapsible insert is expanded to provide a physical structure against which the plastic may be molded to form the frame groove 708.

Also, depicted within the enlarged view 704 is an electronics channel 710. The electronics channel 710 may provide a passageway through which the FPC 222 may be arranged. The electronics channel 710 may extend from the left hinge 306(L) to the right hinge 306(R).

A sensor cavity 712 may be located within the frame bridge 604 of the front frame 602. The sensor cavity 712 provides a volume within which one or more sensors may be arranged. For example, the AC microphone 112 may be emplaced within the sensor cavity 712. The sensor cavity 712 may be in communication with the electronics channel 710. For example, an opening between the electronics channel 710 and the sensor cavity 712 may allow for the FPC 222 to extend within sensor cavity 712. The AC microphone 112 may include other components, such as a cover 714. The cover 714 may comprise a piece of cloth, foam, or other material that allows the transmission of sound vibrations while minimizing the impact of wind on the AC microphone 112, reducing ingress of contaminants, and so forth.

The frame bridge 604 may include one or more fastener receptacles 716. For example, the fastener receptacles 716 may be threaded holes within which a screw may be inserted.

Frame bridge 604 may include one or more nose pad attachment feature 718. For example, the nose pad attachment feature 718 may include cavities within which one or more members of the nose pad 218 may be inserted. In some implementations, an adhesive or mechanical interference fit may be used to maintain the nose pad 218 within the nose pad attachment feature 718.

Figure 8:
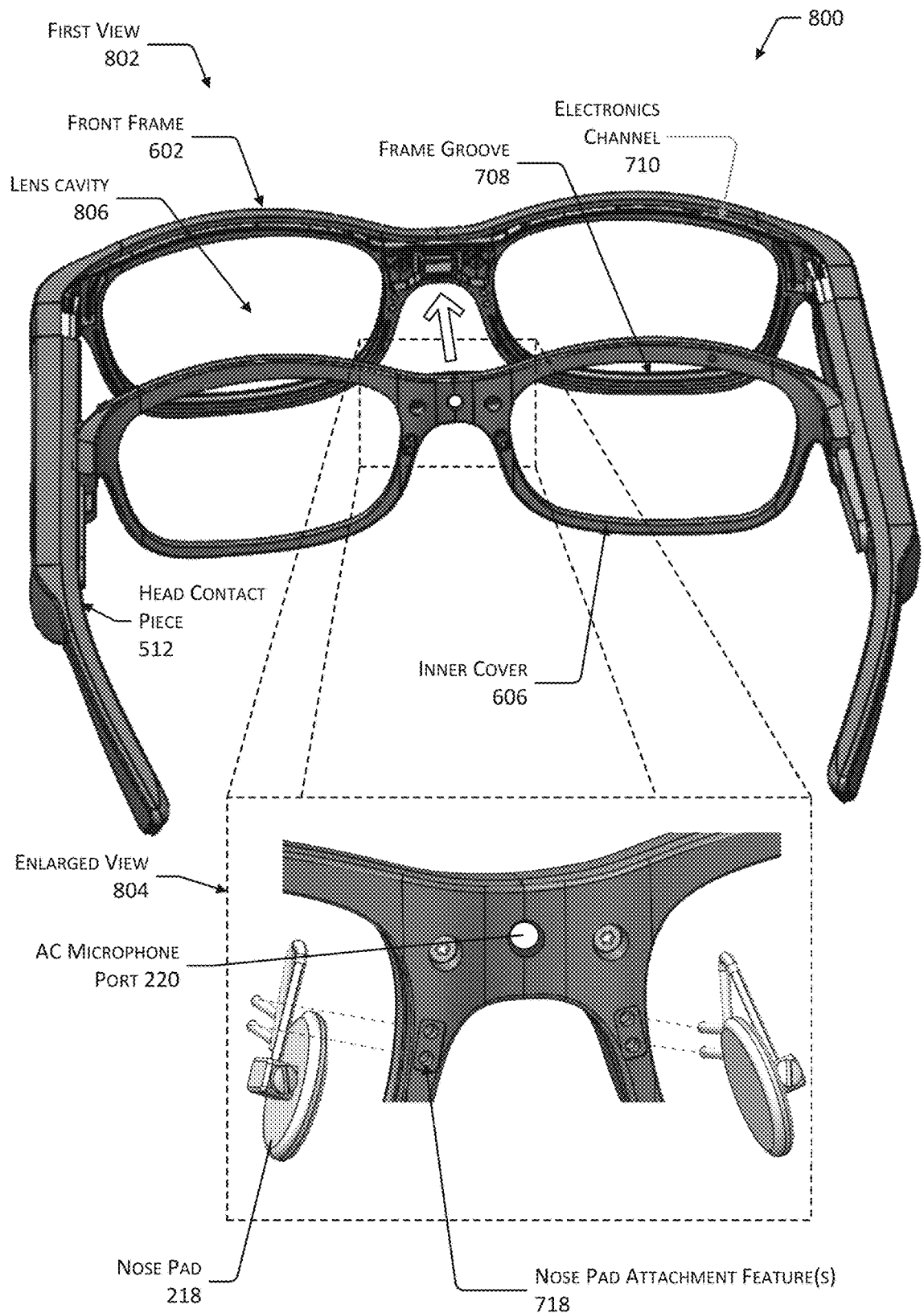
FIG. 8 depicts views of the head-mounted wearable device of FIG. 6, including details of the bridge including the AC microphone port through the inner cover, according to some implementations.

FIG. 8 depicts views 800 of the head-mounted wearable device 106 of FIG. 6, including details of nose pads 218 according to one implementation. A first view 802 depicts the front frame 602 and the inner cover 606, while an enlarged view 804 depicts an enlarged view of the frame bridge 604.

The inner cover 606 may include one or more AC microphone ports 220. The AC microphone port 220 provides an opening through the inner cover 606 into the sensor cavity 712, within which the AC microphone 112 may be situated. While the AC microphone port 220 is depicted at a midpoint of the front frame 602 between the hinges 306, in other implementations the AC microphone port 220 may be located elsewhere on the inner cover 606. In some implementations tubing, ducting, or other structures may be provided between the AC microphone port 220 in the inner cover 606 and a sensor cavity 712 within the front frame 602.

As shown in the first view 802, the front frame 602 includes a left lens cavity 806(L) and a right lens cavity 806(R). During assembly of the HMWD 106, the lenses 108 may be inserted into the respective lens cavities 806, such that the edge of each lens 108 engages and is disposed within at least a portion of the frame groove 708 for the lens cavity 806. Also depicted is the electronics channel 710.

In another implementation, not depicted here, a gasket may be arranged between the front frame 602 and the inner cover 606. In some implementations, an adhesive, room temperature vulcanizing rubber, silicone rubber, or other material may be arranged between the front frame 602 and the inner cover 606. This material may be used to join the two pieces as well as to provide a barrier that prevents intrusion of contaminants into the interior of the front frame 602.

The enlarged view 804 shows additional details with respect to the frame bridge 604. The inner cover 606 may include one or more nose pad attachment feature 718, or holes through which the nose pad 218 may access the nose pad attachment feature 718 present in the front frame 602.

Figure 9:
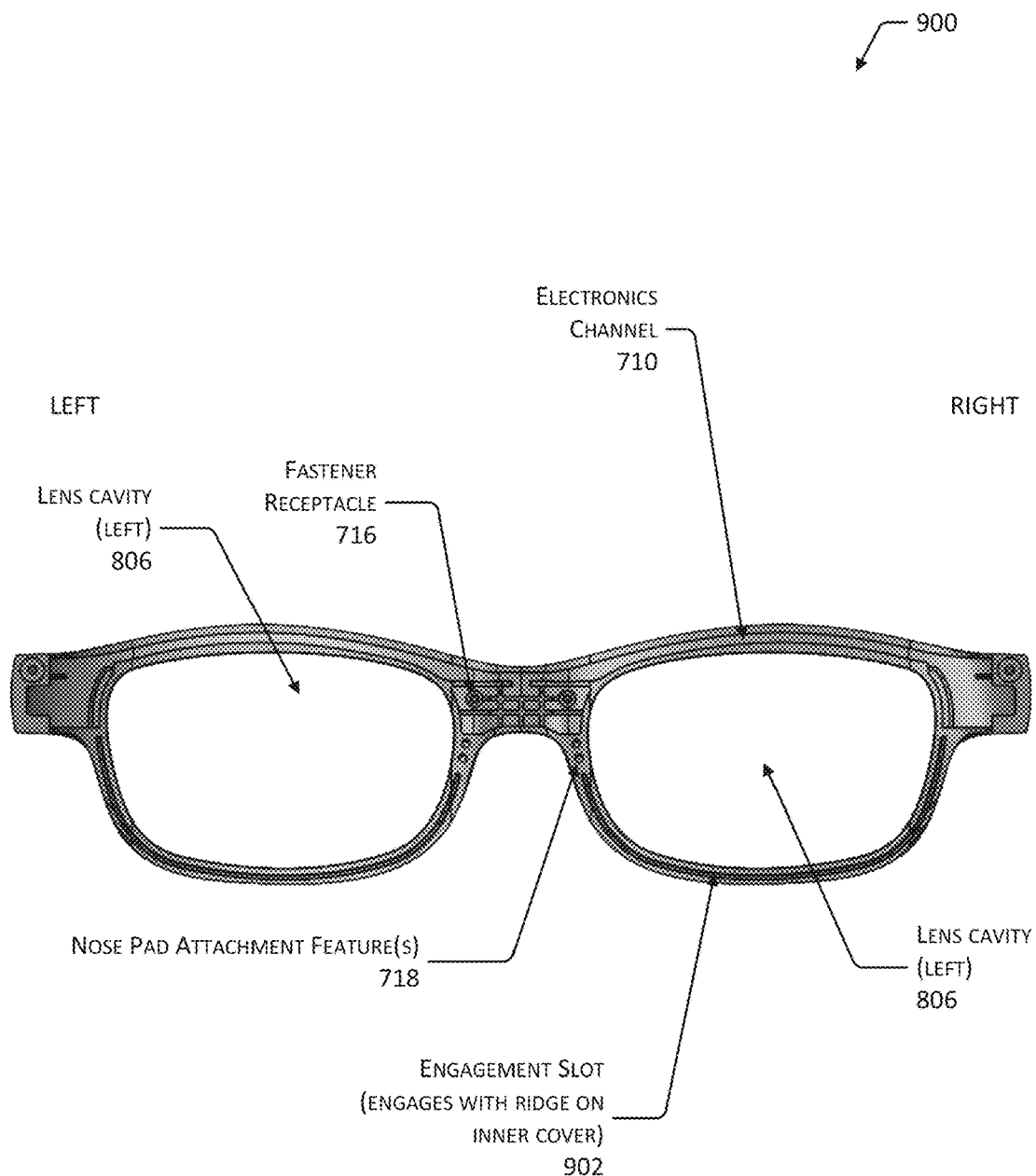
FIG. 9 depicts a view of the front frame depicted of FIG. 6, according to one implementation.

FIG. 9 depicts a rear view 900 of the front frame 602 depicted of FIG. 6, according to one implementation. In this view, several of the previously described features of the front frame 602 are depicted. Each lens cavity 806 may be bounded at least in part by a frame groove 708. Also depicted are engagement slots 902 that are arranged along at least a portion of a perimeter of the lens cavities 806. For example, the engagement slot 902 may comprise a recess within the front frame 602 that extends along approximately one half of a lower portion of a perimeter of a lens cavity 806. The inner cover 606 (not shown in this illustration) may include a complementary or corresponding feature such as a tab or ridge that may be inserted into the engagement slot 902 during assembly. In some implementations, an adhesive may be placed within the least a portion of the engagement slot 902 prior to assembly. In other implementations, the front frame 602 may have a ridge or other protruding feature while the inner cover 606 comprises engagement slot 902. Additional engagement features may be arranged above the lens cavities 806 as well.

Figure 10:
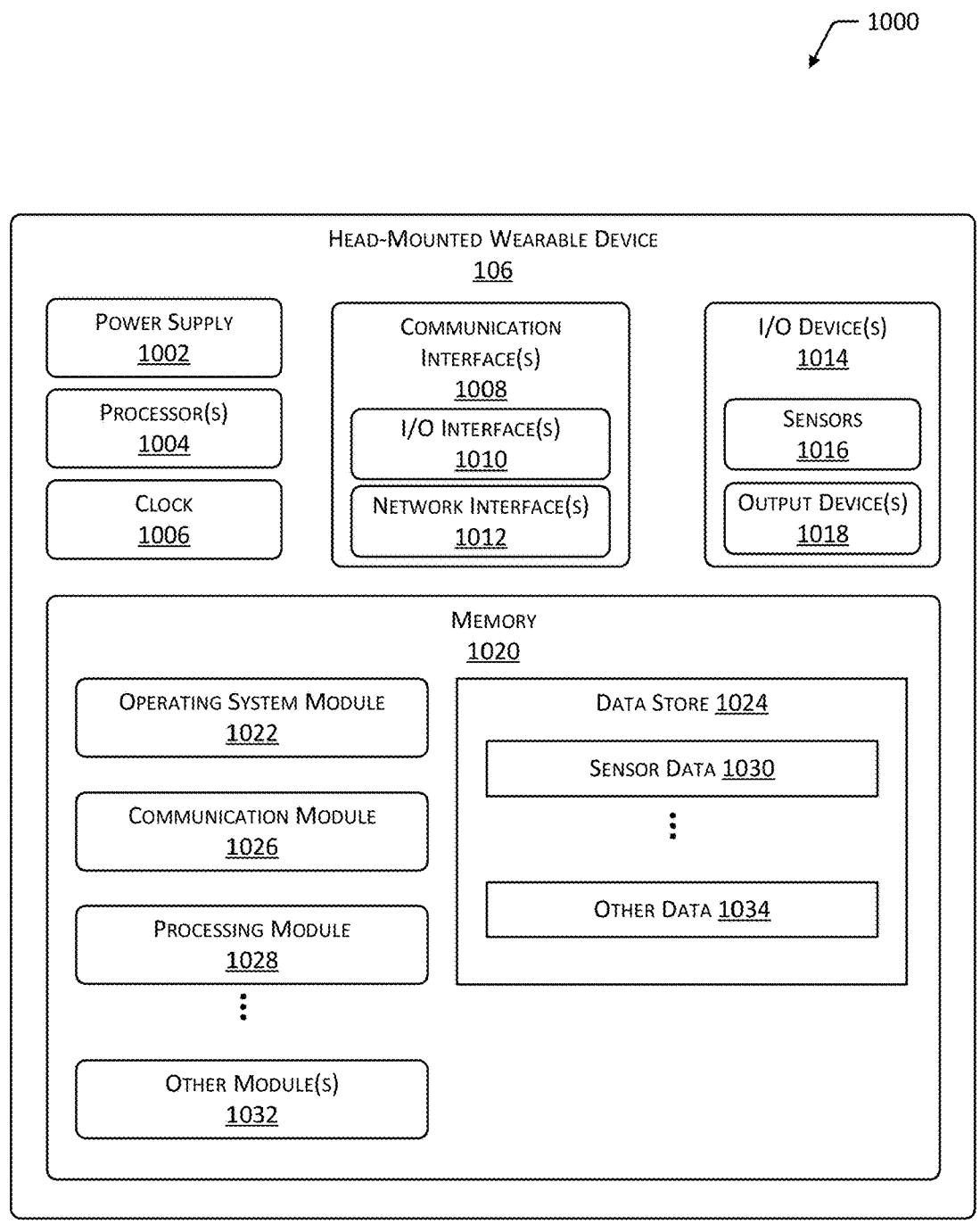
FIG. 10 is a block diagram of electronic components of the head-mounted wearable device, according to some implementations.

FIG. 10 is a block diagram 1000 of components of the head-mounted wearable device 106, according to some implementations.

One or more power supplies 1002 may be configured to provide electrical power suitable for operating the components in the HMWD 106. The one or more power supplies 1002 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive power transfer. In another implementation, electrical contacts may be used to recharge the HMWD 106.

The HMWD 106 may include one or more hardware processors 1004 (processors) configured to execute one or more stored instructions. The processors 1004 may comprise one or more cores. The processors 1004 may include general purpose microprocessors, microcontrollers, application specific integrated circuits (ASICs), digital signal processors (DSPs), and so forth. One or more clocks 1006 may provide information indicative of date, time, ticks, and so forth. For example, the processor 1004 may use data from the clock 1006 to associate a particular interaction with a particular point in time.

The HMWD 106 may include one or more communication interfaces 1008 such as input/output (I/O) interfaces 1010, network interfaces 1012, and so forth. The communication interfaces 1008 enable the HMWD 106, or components thereof, to communicate with other devices or components. The communication interfaces 1008 may include one or more I/O interfaces 1010. The I/O interfaces 1010 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1010 may couple to one or more I/O devices 1014. The I/O devices 1014 may include sensors 1016. The sensors 1016 may include but are not limited to, the AC microphone 112, the BC microphone 114, the touch sensor 312, the button 314, a camera, a proximity sensor, a barometer, a light sensor, an inertial measurement unit, a magnetometer, and so forth. The I/O devices 1014 may also include output devices 1018. The output devices 1018 may include but are not limited to display lights, graphical displays, BC speakers 316, the haptic output devices, air conduction speakers, and so forth. The display lights may comprise one or more light-emitting diodes, quantum dots, incandescent lamps, electroluminescent materials, and so forth. When activated, a display light emits light. One or more display lights may be positioned within the field of view of the user 102 while the HMWD 106 is worn on the head 104. For example, one or more display lights may be arranged just above one or both lenses 108 of the HMWD 106, such as on the front frame 206 or the front frame 602.

In some embodiments, the I/O devices 1014 may be physically incorporated with the HMWD 106 or may be externally placed. The output devices 1018 are configured to generate signals, which may be perceived by the user 102 or may be detected by sensors 1016.

The network interfaces 1012 may be configured to provide communications between the HMWD 106 and other devices, such as the server 118. The network interfaces 1012 may include devices configured to couple to personal area networks (PANs), wired or wireless local area networks (LANs), wide area networks (WANs), and so forth. For example, the network interfaces 1012 may include devices compatible with Ethernet, Wi-Fi®, Bluetooth®, Bluetooth® Low Energy, ZigBee®, and so forth.

The HMWD 106 may also include one or more busses or other internal communications hardware or software that allow for the transfer of data between the various modules and components of the HMWD 106.

As shown in FIG. 10, the HMWD 106 includes one or more memories 1020. The memory 1020 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1020 provides storage of computer-readable instructions, data structures, program modules, and other data for the operation of the HMWD 106. A few examples of functional modules are shown stored in the memory 1020, although the same functionality may alternatively be implemented in hardware, firmware, or as a system on a chip (SoC).

The memory 1020 may include at least one operating system (OS) module 1022. The OS module 1022 is configured to manage hardware resource devices such as the I/O interfaces 1010, the I/O devices 1014, the communication interfaces 1008, and provide various services to applications or modules executing on the processors 1004. The OS module 1022 may implement a variant of the FreeBSD® operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 1020 may be a data store 1024 and one or more of the following modules. These modules may be executed as foreground applications, background tasks, daemons, and so forth. The data store 1024 may use a flat file, database, linked list, tree, executable code, script, or other data structure to store information. In some implementations, the data store 1024 or a portion of the data store 1024 may be distributed across one or more other devices including servers 118, network attached storage devices, and so forth.

The communication module 1026 may be configured to establish communications with one or more of the computing devices 110, other HMWDs 106, servers 118, sensors 1016, or other devices. The communications may be authenticated, encrypted, and so forth.

The processing module 1028 may use sensor data 1030 to determine user inputs, determine information about the environment around the HMWD 106, and so forth. For example, the sensor data 1030 may comprise audio output data generated by one or more of the AC microphone 112, the BC microphone 114, and so forth.

During operation of the system the data store 1024 may store the sensor data 1030 or other data at least temporarily, in the data store 1024.

Techniques such as artificial neural networks (ANN), active appearance models (AAM), active shape models (ASM), principal component analysis (PCA), classifiers, cascade classifiers, and so forth, may also be used to process data.

Other modules 1032 may also be present in the memory 1020 as well as other data 1034 in the data store 1024. For example, the other modules 1032 may include a contact management module while the other data 1034 may include address information associated with a particular contact, such as an email address, telephone number, network address, uniform resource locator, and so forth.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
a front frame having a frame bridge;
a first air conduction microphone arranged within the frame bridge;
a first hinge at a first side of the front frame;
a second air conduction microphone arranged at the first hinge;
a second hinge at a second side of the front frame;
a first temple connected to the first hinge, the first temple comprising a housing;

a bone conduction microphone arranged within the first temple, the bone conduction microphone mechanically coupled to a head contact piece, the head contact piece capable of receiving vocalization vibrations;

one or more support ribs at the first temple that extend from a surface of the housing toward the bone conduction microphone;

a vibration damper arranged between the one or more support ribs and the bone conduction microphone; and a second temple connected to the second hinge.

2. The head-mounted wearable device of claim 1, wherein:

the first air conduction microphone is arranged within a first cavity inside the front frame;

the second air conduction microphone is arranged within a second cavity inside the first hinge; and further comprising:

a first air conduction microphone port that provides a passage between an outside environment and the first cavity; and a second air conduction microphone port that provides a passage between the outside environment and the second cavity.

3. The head-mounted wearable device of claim 1, further comprising:

a first air conduction microphone port through an interior side of the front frame; and a second air conduction microphone port through a bottom surface of the first hinge.

4. The head-mounted wearable device of claim 1, further comprising:

a bone conduction speaker, located on a surface of the first temple proximate to a head of a user, to transmit acoustic output to the head of the user; and an interior support structure disposed within the first temple to provide mechanical support to the bone conduction speaker.

5. The head-mounted wearable device of claim 4, further comprising a pillar arranged between the head contact piece and the bone conduction microphone, wherein the head contact piece and the pillar comprise a unitary piece.

6. The head-mounted wearable device of claim 4, wherein the vibration damper comprises one or more of an elastomeric material or a mechanically compliant structure.

7. The head-mounted wearable device of claim 1, wherein the vibration damper is arranged between a portion of the first temple and the bone conduction microphone.

8. The head-mounted wearable device of claim 1, wherein at least a portion of the first hinge and at least a portion of the second hinge are integral with the front frame.

9. A head-mounted wearable device comprising:

a front frame having a frame bridge;

a first hinge at a first side of the front frame;

a second hinge at a second side of the front frame;

a first temple connected to the first hinge, the first temple including a housing;

a second temple connected to the second hinge;

a first air conduction microphone arranged at the first hinge;

a vibration damper arranged within the first temple;

a bone conduction microphone arranged adjacent to the vibration damper within the first temple, wherein the bone conduction microphone is in contact with at least a portion of a head contact piece and the bone conduction microphone is capable of receiving vocalization vibrations from the head contact piece; and a second air conduction microphone arranged within the frame bridge.

10. The head-mounted wearable device of claim 9, wherein the vibration damper comprises one or more of an elastomeric material or a mechanically compliant structure.

11. The head-mounted wearable device of claim 9, wherein the second air conduction microphone is arranged in a sensor cavity in the frame bridge.

12. The head-mounted wearable device of claim 9, wherein the at least portion of the head contact piece comprises a pillar arranged between the head contact piece and the bone conduction microphone, wherein the head contact piece and the pillar comprise a unitary piece.

13. The head-mounted wearable device of claim 12, further comprising:

proximate to the first air conduction microphone, a first air conduction microphone port through a bottom surface of the first hinge; and proximate to the second air conduction microphone, a second air conduction microphone port through an interior side of the frame bridge.

14. The head-mounted wearable device of claim 9, further comprising:

the vibration damper arranged between a supporting structure of the first temple and the bone conduction microphone, wherein the vibration damper comprises one or more of an elastomeric material or a mechanically compliant structure.

15. The head-mounted wearable device of claim 14, wherein the first temple comprises one or more support ribs that are capable of acting as the supporting structure to the bone conduction microphone arranged within the first temple.

16. The head-mounted wearable device of claim 9, further comprising a rigid member extending between the head contact piece and the bone conduction microphone to mechanically couple the head contact piece to the bone conduction microphone.

17. The head-mounted wearable device of claim 16, wherein the head contact piece and the rigid member comprise a unitary piece.

18. The head-mounted wearable device of claim 9, wherein at least a portion of the first hinge and at least a portion of the second hinge are integral with the front frame.

19. The head-mounted wearable device of claim 9, further comprising:

a bone conduction speaker arranged within the first temple; and wherein the bone conduction speaker is arranged within the first temple proximate to a first end of the first temple.

20. A head-mounted wearable device comprising:

a front frame having a frame bridge;

a first air conduction microphone arranged within the frame bridge;

a first temple connected to the front frame by a hinge, the first temple comprising a housing;

a vibration damper arranged within the housing of the first temple; and a bone conduction microphone arranged adjacent to the vibration damper and within the housing of the first temple, wherein the bone conduction microphone is in contact with at least a portion of a head contact piece capable of receiving vocalization vibrations.

* * * * *